United States Patent Office 2,815,729
Patented Dec. 10, 1957

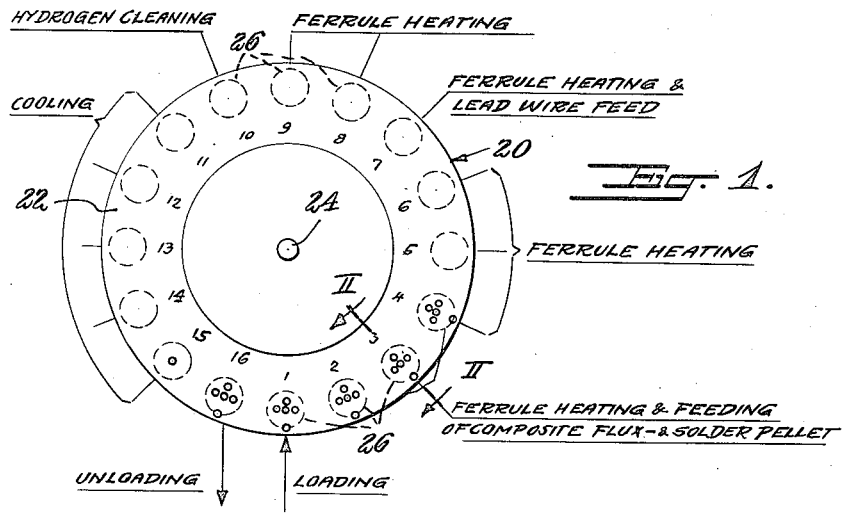
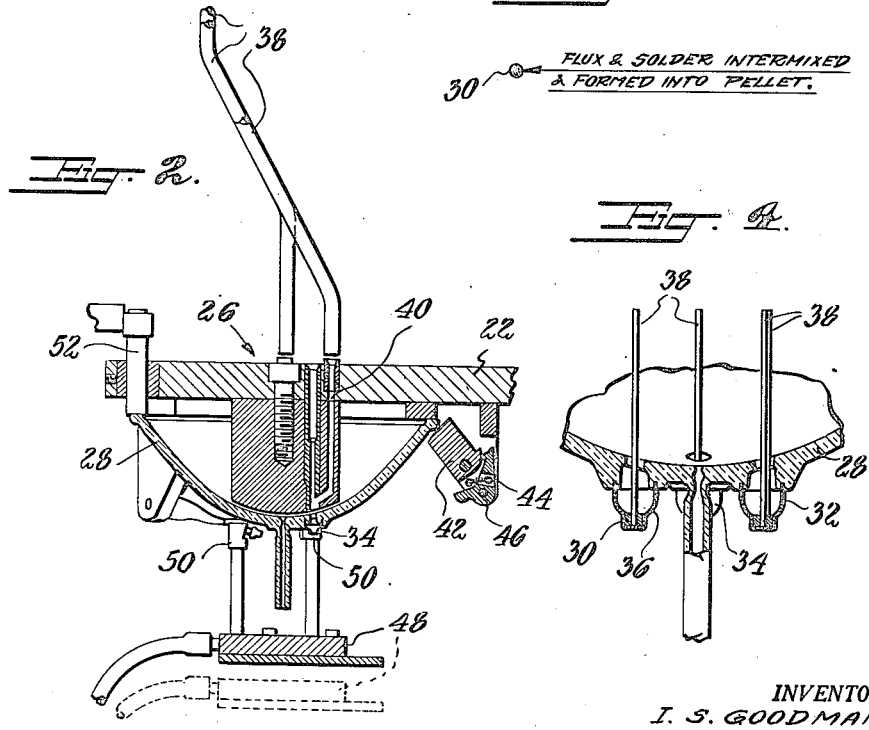

2,815,729

COMPOSITE BRAZING PELLET

Isaac S. Goodman, Belleville, N. J., assignor to Westinghouse Electric Corporation, East Pittsburgh, Pa., a corporation of Pennsylvania Application December 14, 1953, Serial No. 398,105

7 Claims. (Cl. 113—110)

This invention relates to brazing compounds and, more particularly, to a composite brazing pellet for securing the leads or conductors to the ferrules in automobile head lamps.

In the manufacture of "sealed-beam" lamps, nickel-iron contact or terminal ferrules having sharp edges are embedded in the exterior surface of the lamp reflector portion around apertures through which the nickel-iron filament support lead-in conductors extend. These lead-in conductors are normally brazed to the interior surfaces of such ferrules, and in a lamp having two filaments and three ferrules, one of the ferrules carries two leads.

Heretofore it has been the practice to automatically braze the lead wires to the ferrules as described and claimed in co-pending application of McGowan and Hasell, Ser. No. 211,956, filed February 20, 1951, titled "Method and Machine for Processing the Reflectors of Sealed Beam Lamps," now Patent 2,664,760, and owned by the present assignee, and co-pending application of Gray and Bee, Ser. No. 364,742, filed June 29, 1953, titled "Method and Machine for Processing the Reflectors of Sealed Beam Lamps," and owned by the present assignee, which applications are referred to for details of the machinery used in automatically brazing leads to ferrules, which machinery is not here fully described.

As in the afore-mentioned Gray and Bee application, it has been the practice to separately automatically feed the brazing components, namely brass and borax, at separate processing material hoppers on the automatic brazing machine. In such a machine, little trouble has been encountered in automatically feeding or introducing the brazing material, but considerable trouble has been encountered in automatically feeding the borax flux, due to the relative lightness of this material and the relatively small amount of flux required.

Before proceeding to a further consideration of the difficulties of prior art practices, the requirements for the brazing fluxes which can be used are outlined. Various types of material can theoretically be used as a flux, i. e., as a reducing agent to remove oxides from the material being brazed, in order to achieve a good bond or braze. For example, various chlorides, fluorides or phosphates can be used as fluxes, as well as borax, but as a practical material, in such an application as the instant one, borax, or borax with a small addition of boric acid, is the only material which is satisfactory, due to the corrosive nature of the other brazing fluxes. As may be appreciated, where relatively large amounts of flux are to be automatically handled, any corrosive material will react with the equipment involved and with the workman tending same.

Even more important, the method used in brazing the lead-in conductors to the ferrules does not permit removal of flux residue after brazing. If this residue is corrosive, it will tend to eat through the ferrule, which may only be 0.006 inch thick, or even more likely, will react with the aluminum reflecting coating and partially destroy the reflecting nature thereof. Thus borax is the only known brazing which, as a practial matter, may be used.

The brazing material is necessarily limited to brass, for reasons of economics, since in any quantity, consumer item, the most economical material must ordinarily be used, provided it is satisfactory in other respects, in order to meet the competition.

In the prior art practices in order to facilitate the handling of the dry borax, it was formed into small, hollow, generally cylindrical pellets to provide a maximum area for a given amount of borax, in order to facilitate handling by automatic machines. In spite of this operational configuration, many troubles were encountered since each borax "cylinder" weighed only about 14 milligrams. As a matter of practicality, it would have been desirable to use an even smaller borax "cylinder" since the amount of brass brazing material ordinarily required for such an application as the instant one is about 185 milligrams, and the percentage of flux is preferably 1 to 5 percent by weight of the brass. However, the automatic processing material hoppers had enough difficulty in handling the 14 milligrams "cylinder" without making the cylinder even smaller and more difficult to handle. At this point in the description, the troubles encountered in prior art practices are probably obvious. The automatic flux processing material hopper because of the lightness of the material handled would sometimes deposit two or three flux pellets where one was required, or even worse would fail to deposit any flux at all. An excess of flux resulted in flux depositing on the lamp reflector, necessitating an extra cleaning operation, a deficiency of flux resulted in an imperfect braze or no braze at all, with failures encountered in production and in service.

Even when the automatic flux processing material hopper performed as intended, there was still an excess of flux present since, as heretofore pointed out, the smallest flux cylinder which could be handled amounted to some 8% by weight of the brazing material used whereas the desirable quantity of flux is about 1 to 5% by weight of the brazing material.

It is a general object of this invention to avoid and overcome the heretofore noted and other difficulties of and objections to prior art practices by the provision of a composite brazing pellet.

A further object is to provide a composite brazing pellet which is of sufficient weight to be readily handled by automatic processing material hoppers.

Another object is to provide a composite brass and borax brazing pellet for brazing leads to ferrules in sealed beam lamps, which pellet may contain the optimum amounts of brass and borax to effect a good braze.

The aforesaid and other objects of the invention, which will become apparent as the description proceeds, are achieved by providing a composite, homogeneous, generally spherical pellet of finely-divided and pressed borax and brass, which material can be readily handled by automatic processing-material hoppers, and which can be compounded so as to provide desirable proportions of flux and brazing material.

In the long experiments leading up to the instant composite homogeneous pellet, many different combinations of flux and brazing material were tried. As is well-known in the brazing art, the flux must first react with the oxides formed by the brazing heat before the braze itself is formed. Proceeding along this line of thought, the brass brazing material was encased in a coating of borax flux so that the flux would readily melt and remove any oxides before the brazing material itself was melted. While the general idea of this coated pellet was sound, as a practical material it did not work out, as the very thin layer of borax cracked and flaked off in handling, resulting in sporadic failures due to insufficient flux to effect a good braze.

If the flux were contained interiorly of the pellet, i. e., surrounded by the brazing brass, the brass would necessarily have to melt before the flux could escape the surrounding brass to remove the oxides, and a poor braze would result.

Liquid flux (solution of borax in water) as also experimented with, but the feeding operation of the liquid flux was generally unsatisfactory.

Various other combinations of brass and borax were experimented with, such as encasing the borax is a brass tube, but all attempts to combine the flux and brazing material resulted in failures, either due to difficulties encountered in fabricating the composite borax and brass pellet, or due to fragility or poor operation of the resulting composite brazing material.

The brazing material which may be used is a brass having a copper content of between 50% and 70%, with the optimum composition being about 60% copper and 40% zinc. The melting point for this 60-40 brass is approximately 890° C., the melting point for the 70-30 brass is about 925° C. and the melting point for the 50-50 brass is about 875° C. It is desirable to use a relatively low melting point brazing material, since as less heat is required, the braze may be more easily effected and the glass components of the reflector are subjected to less strain during the brazing operation. I prefer to use a 60-40 brass since the quality of the resulting braze is a little better than the 50-50 brass braze.

The melting point of dry borax is approximately 741° C. and it can thus be seen that there is only about 150° C. difference in the melting points of the borax flux and the melting point of the most desirable brazing material. In order to maintain production schedules on this quantity, consumer item, the brazing fire time must be minimized and the time allowed for the flux to completely melt before the brass melts is only about eight seconds.

In addition, in the practices of the prior art, the borax melted immediately upon reaching a temperature of about 741° C., and thus served to immediately start to reduce the oxides formed on the ferrule and protect the ferrule interior surface from further oxidation before the brass brazing material melted. In this invention, a large part of the borax must first find its way through the brass matrix of the pellet before reduction and ferrule interior surface protection can be effected. Since borax is a relatively slow acting flux, it was unexpected that the oxides on the ferrule surface would be completely reduced in the eight seconds required to melt the brass, particularly in view of the fact that more oxides probably are initially formed on application of heat than in prior art practices, since the protective action of the flux of the composite pellet must necessarily be slower than the flux pellet of the prior art. It was thus completely unexpected that substantially all the flux contained in a substantially homogeneous generally spherical pellet comprised of finely divided, pressed borax and brass would find its way through the brass matrix of the pellet during brazing, before the brass brazing material itself melted, in view of the relatively small difference in the melting points of the brass and the borax, and the relatively short time during which the fires are applied for brazing.

For a better understanding of the invention, reference should be had to the accompanying drawing, wherein:

Fig. 1 is a diagrammatic plan view of an apparatus for brazing lead-in conductors to "sealed-beam" lamp reflector ferrules;

Fig. 2 is a fragmentary elevational view, partly in section, on the line II—II of Fig. 1, in the direction of the arrows;

Fig. 3 is an elevational view of a composite brazing pellet embodying the invention;

Fig. 4 is a fragmentary enlarged axial sectional view of a reflector portion of a "sealed-beam" lamp, illustrating the lead-in conductors as brazed to the ferrules.

Although the principles of this invention are broadly applicable to any brazing operation, and more particularly to any brazing operation concerning lamp lead-in conductors and ferrules, the invention is usually employed in brazing "sealed-beam" lamp lead-in conductors to ferrules, and hence it has been so illustrated and will be so described.

With specific reference to the form of the invention illustrated in the drawings, the numeral 20 indicates generally an automatic brazing machine comprising a table 22 which is supported on a pedestal and vertical shaft 24. A motor drives the shaft 24 to intermittently rotate and index the 16 heads 26 carried by the table 22 through the necessary stations to accomplish the lead-in conductor-ferrule brazing.

When one of the heads 26 calls at station "1," it is indexed and receives a reflector 28. The loaded head is then moved past station "2" and indexed at station "3," where a composite brazing pellet 30, as illustrated in Fig. 2, is fed into each of the lamp ferrules 32, 34 and 36, as illustrated in Fig. 4. From stations "4" to "6" the ferrules are heated by gas flames, and the heating is continued on through station "7" where a lead conductor 38 is fed into each of the two ferrules 34 and 36 and two lead conductors are fed into the other ferrule 32.

At stations "8" and "9," ferrule heating is continued to insure that the lead wires are well bonded or brazed within the ferrules. At station "10," a stream of hydrogen is used to burn the oxidation from the ferrules, which are partially cooled in said hydrogen stream to minimize further oxidation.

At stations "11," "12," "13," "14" and "15," the ferrules are cooled by jets or air, and at station "16" the reflectors, with lead-in conductors brazed to the ferrules, are unloaded from the brazing machine and transferred for the next step in the lamp fabrication.

The foregoing brazing equipment is substantially the same as illustrated and described in the aforementioned Gray and Bee application, except that only one automatic processing material hopper is needed to feed the composite brass and borax brazing pellets.

An expanded sectional view of station "3" is shown in part in Fig. 2 and the processing material hopper used at this station is as illustrated and described in the aforementioned Gray and Bee application. As shown, a lamp reflector 28 is carried by the head 26 which is in turn carried by the table 22. At this station the head is automatically positioned to cooperate with the chutes 38 of the processing material hopper so that each of the ferrules 32, 34 and 36 may receive one of the composite brazing pellets of this invention. Three separate chutes 38 are used and cooperate with each of the ferrule connecting head chutes 40.

Each head 26 on the brazing machine 20 is provided with a plurality, preferably 3, latches 42 which swing from the release or upper position to the locking position illustrated in Fig. 2, where they underlie the rim of a reflector 28 and hold it in place on a head of the brazing machine when indexed at station "1." These latches are held in place by means of a spring 44, which is controlled by a keeper 46, which in turn is automatically moved upwardly to actuate the latch when the reflector is loaded or unloaded.

As in the afore-mentioned Gray and Bee application, a vertical reciprocable plate 48 carries the ferrule sealing fire gas fixture 50 for ferrule brazing. The rod 52, shown in Fig. 2, acts to stop the operation of the automatic processing material hopper if a reflector is missing, as explained in the afore-mentioned applications.

The composite brazing pellets of this invention, as heretofore mentioned, each consist of a mixture of finely divided 50–50 to 70–30 brass and a dry borax, with the optimum brazing material being a 60–40 brass. It has been found that about 185 milligrams of brazing material will result in a good braze with no excess of material, and this amount of brazing material when compressed into a generally spherical pellet will have a diameter of approximately 0.150 inch. This amount of brazing material and, consequently, the afore-mentioned pellet size, is given by way of example and not by way of limitation. The amount of brazing material used may vary considerably and a satisfactory braze will still result. Thus no limits are specified for pellet size, as the most desirable size may vary with lamp design.

As heretofore noted, the amount of borax flux should constitute approximately from 1 to 5 percent by weight of the brazing material and the optimum amount of borax is about 1½% by weight of the brass brazing material. If less than 1% by weight of borax is used, service failures are apt to occur, and if more than 5% by weight of borax is used, there will be a certain amount of excess borax deposited on the reflector which necessitates an extra cleaning operation.

The permissible particle size of the unpressed components of the composite pellet is fairly limited. I have found that if the particle size of the powdered brass and borax is less than about 74 microns as determined by a No. 200 sieve (A. S. T. M. Standards), the forming dies used in pressing the pellets will become clogged. The lower limit for the permissible particle size is thus one which is specified because of manufacturing convenience and not a limitation necessitated by the brazing characteristics of the brazing pellet.

The upper limit for the particle size for the unpressed powdered components of the pellet is about 420 microns as determined by a No. 40 sieve (A. S. T. M. Standards) and this upper limit is again more necessitated by manufacturing limitations rather than the brazing characteristics of the composite pellet. If the particle sizes of the components of the composite pellet are greater than about 420 microns, the powdered brass and borax cannot be thoroughly mixed during pellet fabrication to produce a substantially homogeneous mixture, since the heavier and relatively large brass particles will tend to settle out. It can readily be seen that the finished composite pellet should be substantially homogeneous in order to insure that one pellet is not richer in brass, for example, than other pellets. Thus where the pellets are substantially homogeneous throughout, uniformity of performance is assured.

The configuration of the composite pellet is preferably generally spherical since such a shape lends itself to automatic handling during brazing and pressing during pellet fabrication. Shapes other than spherical would perform satisfactorily if they could be automatically processed, provided the pellet was homogeneous throughout with regard to the brass and borax particles.

In fabricating my pellet, finely divided brass of an average particle size of about No. 100 sieve (A. S. T. M. Standards), for example, is mixed with borax of an average particle size of about No. 60 sieve (A. S. T. M. Standards). One hundred eighty-five milligrams of this finely divided or powdered brass and 2.8 milligrams of powdered borax are used for every pellet it is desired to form. To insure substantial homogeneity of mix, the foregoing components are mixed from 1 to 2 hours. About 0.1% by weight of the mix of hydrogenated vegetable oil may be added during the mixing step, if desired, to facilitate pressing, although this is not necessary.

The finely divided substantially homogeneous mixture is then formed into generally spherical pellets having a diameter of about 0.150 inch by placing the afore-mentioned amount of said mixture into a die and applying a force of about one-half ton on the die plunger. The composite pellets may then be loaded into the processing material hopper.

It should be noted that there may be added to the unpressed mixture of brass and borax from traces (0.1%) up to about 5% by weight of the pellet of powdered tin, and/or indium and/or other low melting point metals or alloys which improve adherence of the brazing material to the material to be brazed through the formation of lower melting point constituents, a specific example being an addition of 2% by weight of indium or tin. Such material additions are desirable, but not necessary.

In order to increase the brittleness of the brass to enable it to be more readily crushed, manganese or other higher melting point alloys, which through formation of intermetallic compounds increase the brittleness of brass, may be added in amounts varying from traces (0.1%) to 5% by weight of the composite pellet, a specific example being an addition of 2% by weight of manganese. Such material additions do not affect the performance of the brazing material itself and are desirable, but not necessary.

It will be recognized that the objects of the invention have been achieved by providing a composite brass and borax brazing pellet which may be readily handled by automatic processing material hoppers, and in which the optimum amounts of brass and borax may be used.

As a further advantage of my new composite pellet, a cost reduction of approximately 50% has been effected. In the prior art practices where the brass was introduced as a solid brass pellet, the pellet cost was approximately 75 cents per pound of pellets. This cost was due to the fact that the pellets were formed by placing brass wire through a die, pellet forming machine. The powdered brass contained in the pellets of this invention costs approximately 32 cents a pound and the pellet formation is a relatively inexpensive process. Thus the cost reduction is approximately 50% and in a large volume item this small unit saving amounts to thousands of dollars annually.

While in accordance with the patent statutes, one best known embodiment of the invention has been illustrated and described in detail, it is to be particularly understood that the invention is not limited thereto or thereby.

I claim:

1. A composite brazing pellet for brazing lead conductors to sealed beam lamp ferrules comprising, a substantially homogeneous and unsintered mixture of pressed finely divided brass and flux, said brass having a copper content of between 50% and 70%, and said flux consisting essentially of borax in amount of from about 1 to 5 percent by weight of said brass.

2. A composite brazing pellet for brazing lead conductors to sealed beam lamp ferrules comprising, a substantially homogeneous and unsintered mixture of pressed finely divided brass and flux, said brass having a copper content of between 50% and 70%, said flux consisting essentially of borax in amount of from about 1 to 5 percent by weight of said brass, and the average particle size of said brass and said borax being from about 74 microns to about 420 microns.

3. A generally spherical composite brazing pellet for brazing lead conductors to sealed beam lamp ferrules comprising, a substantially homogeneous and unsintered mixture of pressed finely divided brass and flux, said brass having a copper content of between 50% and 70%, said flux consisting essentially of borax in amount of from about 1 to 5 percent by weight of said brass, and the average particle size of said brass and said borax being from about 74 microns to about 420 microns.

4. A generally spherical composite brazing pellet for brazing lead conductors to sealed beam lamp ferrules comprising, a substantially homogeneous and unsintered mixture of pressed finely divided brass and flux, said brass having a copper content of between 50% and 70%, said flux consisting essentially of borax in amount of from about 1 to 5 percent by weight of said brass, the average particle size of said brass and said borax being from about 74 microns to about 420 microns, and an addition of from traces to about 5% by weight of said pellet of manganese.

5. A generally spherical composite brazing pellet for brazing lead conductors to sealed beam lamp ferrules comprising, a substantially homogeneous and unsintered mixture of pressed finely divided brass and flux, said brass having a copper content of between 50% and 70%, said flux consisting essentially of borax in amount of from about 1 to 5 percent by weight of said brass, the average particle size of said brass and said borax being from about 74 microns to about 420 microns, and an addition of from traces to about 5% by weight of said pellet of at least one material of the group consisting of tin and indium.

6. A generally spherical composite brazing pellet for brazing lead conductors to sealed beam lamp ferrules comprising, a substantially homogeneous and unsintered mixture of pressed finely divided brass and flux, said brass having a copper content of between 50% and 70%, said flux consisting essentially of borax in amount of from about 1 to 5 percent by weight of said brass, the average particle size of said brass and said borax being from about 74 microns to about 420 microns, an addition of from traces to about 5% by weight of said pellet of manganese, and a further addition of from traces to about 5% by weight of said pellet of at least one material of the group consisting of tin and indium.

7. A generally spherical composite brazing pellet for brazing lead conductors to sealed beam lamp ferrules comprising, a substantially homogeneous and unsintered mixture of pressed finely divided brass and flux, said brass having a copper content of between 50% and 70%, said flux consisting essentially of borax in amount of from about 1 to 5 percent by weight of said brass, the average particle size of said brass and said borax being from about 74 microns to about 420 microns, an addition of from traces to about 5% by weight of said pellet of a metal having a melting point higher than the melting point of said brass and which forms intermetallic brass compounds to increase the brass brittleness, and an addition of from traces to about 5% by weight of said pellet of a metal having a melting point lower than said brass and which forms brass constituents having melting points lower than said brass to improve the adherence of said brass for said ferrule and said lead conductors.

References Cited in the file of this patent

UNITED STATES PATENTS

| | | |
|---|---|---|
| 1,980,927 | Parker | Nov. 13, 1934 |
| 2,033,102 | Berry | Mar. 3, 1936 |
| 2,645,006 | Hadley | July 14, 1953 |
| 2,661,282 | Daley | Dec. 1, 1953 |

FOREIGN PATENTS

| | | |
|---|---|---|
| 680,588 | Great Britain | Oct. 8, 1952 |

OTHER REFERENCES

Metals Handbook, 1939 edition, page 1212, published by American Society for Metals, 7301 Euclid Avenue, Cleveland, Ohio.